July 21, 1959    J. N. WOGNUM ET AL    2,895,289
CHAIN LINK REMOVING TOOL
Filed Dec. 3, 1956    2 Sheets-Sheet 1
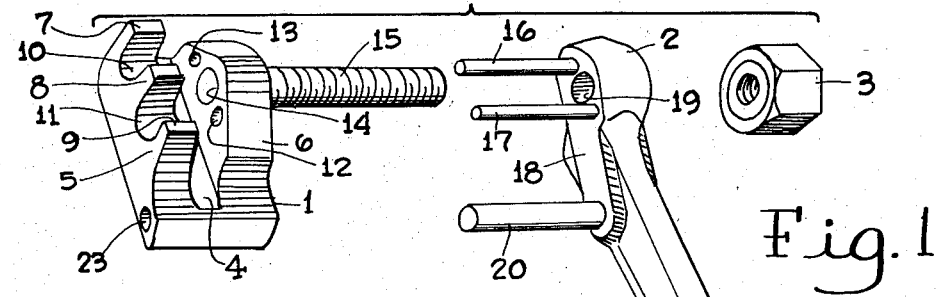
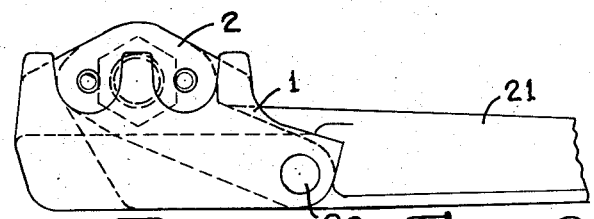
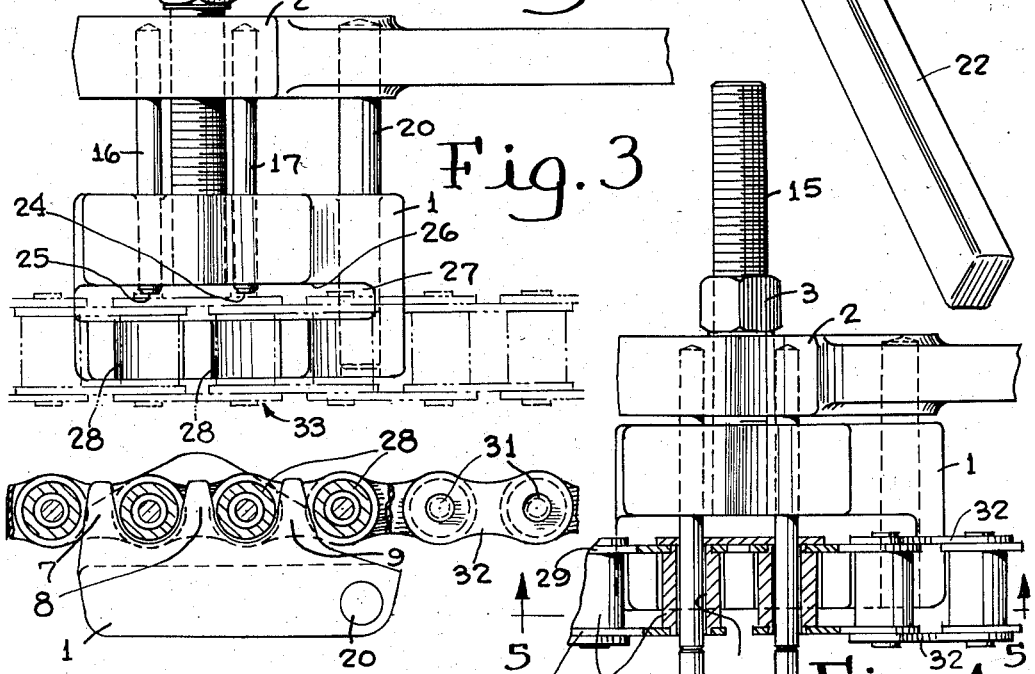
INVENTORS
James N. Wognum
Martin J. Teibel
BY Willis S. Wognum
William P. Porcelli
Atty INVENTORS
James N. Wognum
Martin J. Teibel
Willis S. Wognum
BY William P. Porcelli
atty

United States Patent Office 2,895,289
Patented July 21, 1959

2,895,289

CHAIN LINK REMOVING TOOL

James N. Wognum, Chicago, Ill., and Martin J. Teibel and Willis S. Wognum, Crown Point, Ind., assignors to Twin Martin Corporation, Chicago, Ill., a corporation of Illinois Application December 3, 1956, Serial No. 625,742

1 Claim. (Cl. 59—7)

This invention relates to improvements in chain link removers and particularly to a device for facilitating the removal of a link from a roller chain.

The particular type of chain under consideration is one ordinarily composed of two different type links pivotally joined together, one link containing rollers provided with central apertures and the other link being provided with two pins for engagement with the apertures of the rollers to provide the pivotal connections between the links. The usual construction of this type of chain has the ends of the pins peened or otherwise deformed to provide them with shoulders for preventing dislodgement of the pins and thereby keep the chain links assembled.

These roller chains ordinarily are used to transmit power between driving and driven sprockets and it is often necessary to divide the chain by removing a chain link when the chain is to be either repaired or removed from a machine for any number of reasons, or when chain is being cut to length prior to its initial use on a machine.

One of the common ways of removing a chain link is by using a drive pin for driving out one pin at a time. This method is usually awkward and cumbersome because it requires some backing support for the chain which is not usually conveniently available except on a work bench. Since the link oftentimes must be removed at the machine, the work bench facilities cannot be used at those times.

There are devices available for disconnecting roller chain links, but it seems that they also have certain shortcomings. On one known device, even though the tool is used to start the removal of one pin at a time, a drive pin must be used subsequently for the final removal of the pin in cases where the burr of the peened head of the pin maintains a tight fit of the pin in the aperture of its associated roller. Another shortcoming of this same device is that, because only one pin is removed at a time, the link being removed is oftentimes distorted and permanently bent and great effort generally is required for removal of the link.

Still another manner of dividing a roller chain is by shearing a link. This has the obvious disadvantage of destruction of the link so that it cannot be reused.

It is the principal object of this invention to provide an improved chain link removing tool which enables the operator to remove a link in its entirety from a roller chain in a simple and quick manner. This is accomplished by providing a tool which conveniently holds the chain and provides a backing surface for it regardless of the location of the chain, whether it be on a workbench or at the machine, and drives both pins of a chain link simultaneously and completely until the link is entirely removed.

It is another object of this invention to provide a link removing tool which can be manufactured at relatively low cost.

It is another object of this invention to provide an improved link removing tool which can be adapted for either manual operation or for operation with power means.

The invention can be better understood by referring to the accompanying drawings in which, Figure 1 shows an exploded view of the principal parts of a manually operated tool made according to the principles of this invention;

Fig. 2 shows a partial side elevation of the tool of Fig. 1, but in its assembled form;

Fig. 3 shows a top plan view of the tool as shown in Fig. 2 and also shows a roller chain in phantom lines in a position preparatory to removing a link from it;

Fig. 4 shows a top plan view similar to Fig. 3, except that the tool is shown positioned with its parts as they appear after a chain link has been removed from a roller chain. The chain is shown in partial cross-section;

Fig. 5 shows a sectional view along the line 5—5 of Fig. 4; and

Figure 6:
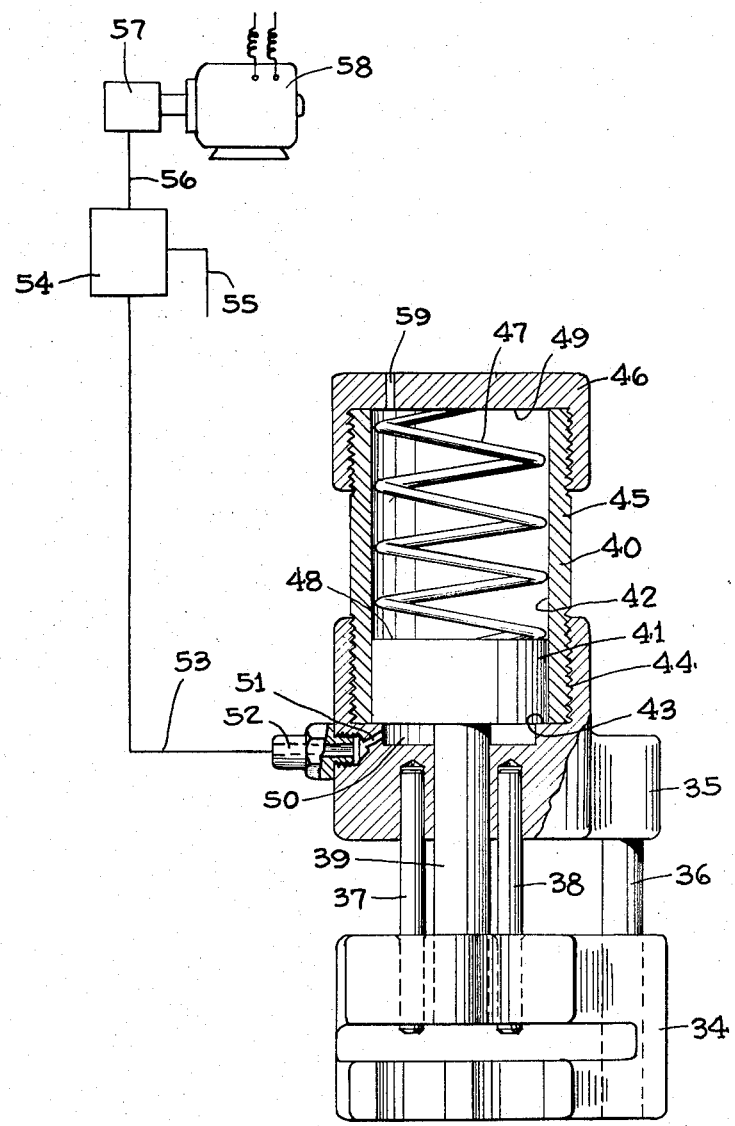
Fig. 6 shows a tool similar in function to the manually operated tool, but, instead, constructed for power operation from an air pressure source.

A preferred embodiment of the invention, as indicated in Fig. 1, consists of three basic components. They are a chain support frame 1, a driving pin supporting frame 2 and a nut 3. The frame 1 is channel shaped to have a bottom section 4 connected between two side walls 5 and 6. The side wall 5 extends parallel to the side wall 6 and it is provided with three vertical members 7, 8 and 9 which provide the boundary walls for two semi-circular yokes 10 and 11 which are provided for supporting two adjacent rollers of a roller chain link. The side wall 6 is provided with two holes 12 and 13 which extend entirely through it. These holes 12 and 13 are concentric with the radius center of the semi-circular yokes 10 and 11 of the side wall 5. The side wall 6 is further provided with an aperture 14 into which the inner end of a threaded shaft 15 is fixed. The outer end of the shaft 15 extends in cantilever fashion away from the frame 1.

The drive pin support frame 2 is provided with two drive pins 16 and 17 which are fixed in apertures in the frame 2. They extend in a direction perpendicular to the face 18 of the frame 2. In addition, the frame 2 is provided with a hole 19 extending entirely through it. Rearwardly of the drive pins 16 and 17 is a guide pin 20. The frame 2 is provided with a long handle 21 having a hand grip 22 at its extreme outer end. This handle 21 permits convenient manipulation of the tool when it is used.

In its assembled form, the shaft 15 in the frame 1 is passed through the hole 19 in the frame 2 so that the free end of the shaft 15 protrudes through the hole at the back of the frame 2. At the same time, the drive pins 16 and 17 pass into and through the holes 13 and 14 in the frame 1. Similarly, the guide pin 20 passes through another hole 23 provided at one end of the frame 1. The purpose of this guide pin 20 is to stabilize the positioning of the frame 1 relative to the frame 2 so that no binding occurs between the shaft 15, the pins 16 and 17 and the holes through which they pass. After the frame 2 is assembled to the frame 1, the nut 3 is screwed onto the end of the shaft 15 until all parts achieve a position as shown in Fig. 3. As shown in Fig. 3, the outer ends 24 and 25 of the pins 16 and 17 protrude beyond the face 26 of the side wall 6. This leaves room in the channel 27 provided between the walls 5 and 6 for positioning of a roller chain.

The roller chain generally is constructed of two types of links. On link consists of two rollers fastened together by two end plates 29. Each of the rollers is provided with a central aperture 30. The other link consists of two pins 31 held together at their ends by two side plates 32. In assembled form, the pins 31 pass through the apertures 30 and provide pivots for the roller chain. The side plates 32 actually retain the chain in assembled form. In order to disassemble the chain, it is necessary to remove one of the links provided with the two pins 31 and this is achieved by driving out the pins 31. Ordinarily, the ends of the pins are peened over to provide a shoulder against which the side plates are retained. In order to remove the pins, it is necessary to deform the shoulder to reduce the size of the ends of the pins 31 to a size corresponding to the apertures 30 of the rollers so that the pins 31 can be driven through the rollers and removed.

As indicated in Fig. 3, in phantom lines, a roller chain 33 is positioned on the frame 1 of the tool in a position ready for removal of a link. Two of its adjacent rollers 28 are held within the yokes 10 and 11 of the side wall 5. The vertical members 7, 8 and 9 project upwardly between the rollers and provide the backing support for the chain link side plates 29 and 32 when the tool is being actuated.

As shown in Fig. 4, a link provided with the two pins 31 has been removed and all parts of the tool are shown as they appear at the conclusion of the removing stroke of the tool. In order to drive the two drive pins 16 and 17 against the pins 31 and thereby effect their removal, the nut 3 is tightened against the other face of the frame 1, preferably by means of a wrench. This causes the shaft 15 to be pulled through its aperture 19 in the frame 2. As this occurs, the drive pins 16 and 17 are driven forward to deform the shoulders at the ends of the pins 31 and drive the pins 31 through the apertures 30 of the rollers 28 and finally remove the pins 31 entirely from the roller chain. After this has occurred, the nut can be loosened and all parts returned to their positions as shown in Fig. 3. Returning the parts removes the drive pins 16 and 17 from the apertures 30 of the rollers 28 so that the roller chain can be removed from the tool. With the link portion consisting of two pins 31 and a side plate 32 removed, the roller chain is divided.

As shown in Fig. 6, there is provided a chain link removing tool similar in function to that as shown in Figs. 1 through 5, but provided with an air powered cylinder having a piston for actuating the tool. The tool consists of a chain support frame 34 and a driving pin supporting frame 35 which are both similar to the frames 1 and 2, respectively, as provided for the manual tool. Similarly the frame 35 is provided with a guide pin 36 for preventing binding of two drive pins 37 and 38 provided in the frame 35 and a piston rod 39 which is similar in function to the threaded shaft 15 of the manual device. The outer end of the piston rod 39 is secured in a fixed position in the frame 34. Although the frame 35 is similar in function to the frame 2 of the manual device, it is differently shaped in order to accommodate an air cylinder 40 behind it. The piston rod 39 is connected at its inner end to a piston 41 which travels inside the air cylinder 40 and is of the same diameter as the inner surface 42 of the air cylinder. The frame 35 is provided with an annular shoulder 43 against which the piston 41 bottoms in order to limit its return stroke. The rear portion of the frame 35 is provided with an internally threaded bore 44 which engages one end of a sleeve 45 which is the major portion of the air cylinder 40. The outer end of the sleeve 45 is also threaded to actuate an internally threaded end cap 46. A compression spring 47 is provided between the inner end 49 of the piston 41 and the inner surface 49 of the end cap 46. This spring 47 urges the piston 41 downwardly toward the annular shoulder 43. Forward of the annular shoulder 43 is a space 50 into which air under pressure may be introduced through a port 51 provided with a threaded fitting 52 connected to an air line 53. The air line 53 connects to a three-way valve 54 with an exhaust line 55 and an air inlet line 56. The air inlet line 56 leads from an air compressor 57 driven by an electric motor 58. At the rear end of the air cylinder 40 there is a vent 59 in the end cap 46.

In operation, it is necessary to cause the drive pins 37 and 38 to be driven forward relative to the frame 34. This relative movement is achieved by causing the frame 34 to move relative to the drive pins 37 and 38. In order to do this, the air valve 54 is actuated so that the air inlet line 56, which is supplied with air pressure from the air compressor 57, is connected to the air line 53 which feeds air under pressure into the space 50 and presses against the piston 41 to cause it to retract against the force of the spring 47. Air is evacuated from the spring side of the piston through the vent 59. When the piston 41 moves in this direction, it is apparent that the frame 34 slides relative to the drive pins 37 and 38 in order to achieve the proper operation of the tool for displacing the pivot pins of a chain link. When it is necessary to cause the return of the piston 41 and retract the drive pins 37 and 38 relative to the frame 34, the air valve 54 is operated so that the air line 53 is connected to the exhaust line 55. This relieves the pressure on the pressure side of the piston 41 to permit the pressure of the spring 47 to cause return of the piston to a position as shown in Fig. 6. At this time, the frame 34 is extended relative to the driving pins 37 and 38 and the tool is ready for another operation.

From this description it should be apparent that a tool has been provided which can quickly and efficiently dislodge and remove a link from a roller chain with a minimum of effort. Although two forms of the device have been shown in a particular manner, it will be obvious to a person skilled in the art that it may be constructed in different ways with slight modifications without departing from the true scope of the following claim.

We claim:

A tool for disconnecting a link from a roller chain of a type having roller links retained in longitudinally spaced relationship by means of connecting links having two parallel spaced side plates assembled onto two parallel spaced pivot pins whose ends are deformed into rivet-like connections with the side plates, comprising a chain support member provided with two spaced apart side walls, the front wall being provided with at least two yokes placed side by side and spaced from each other a distance approximately equal to the distance between two adjacent rollers of adjacent roller links and of a thickness less than the length of the rollers in order to accommodate positioning thereon of the two rollers, the rear wall being provided with two apertures extending therethrough and each aligned with the radial center of one of the yokes to thereby be in alignment with two adjacent pivot pins of a connecting link joining together two adjacent roller links positioned in the yokes, a block positioned behind said rear wall of said chain support member and provided with two drive pins extending forwardly of the block and slidably guided for movement of translation through the two apertures in the rear wall and for a distance equal to the thickness of said rear wall plus the length of said pivot pins of the roller chain, said pins having a diameter smaller than that of the chain apertures which receive said pivot pins said rear wall being provided with a rearwardly extending threaded shaft which is guided through an aperture in said block with its free end projecting rearwardly beyond said block, said free end being provided with a threaded nut which can be rotated onto it for causing the threaded shaft to be drawn rearwardly through the aperture in said block as the nut reacts against the rear surface of said block for causing relative movement of the chain support member toward the block in order to cause the two drive pins to simultaneously contact the two adjacent pivot pins of said two rollers positioned in said yokes and upset the rivet-like connections between the two pivot pins and one of said two side plates of a connecting link to thereby bodily extract from the roller chain the two adjacent pivot pins and the other of said two side plates to which they are still integrally joined by rivet-like connections, said block being provided with a third forwardly extending pin fastened at a position out of alignment with the positions where the two drive pins are connected to the block, said third pin being guided through another aperture provided in the chain support member to insure proper alignment of the drive pins with the pivot pins and minimize the possibility of binding as the tool is actuated.

References Cited in the file of this patent

UNITED STATES PATENTS

| | | |
|---|---|---|
| 1,000,867 | Widmayer | Aug. 15, 1911 |
| 2,020,162 | Rodgers | Nov. 5, 1935 |
| 2,237,069 | Christenson | Apr. 1, 1941 |
| 2,622,389 | Sjostrom et al. | Dec. 23, 1952 |

FOREIGN PATENTS

| | | |
|---|---|---|
| 148,715 | Great Britain | Aug. 5, 1920 |
| 180,458 | Great Britain | June 1, 1922 |
| 275,768 | Great Britain | Aug. 18, 1927 |
| 397,817 | Great Britain | Aug. 31, 1933 |
| 851,760 | France | Jan. 15, 1940 |
| 103,027 | Sweden | Nov. 11, 1941 |
| 981,419 | France | May 25, 1951 |